United States Patent [19]

Takano et al.

[11] Patent Number: 4,645,046

[45] Date of Patent: Feb. 24, 1987

[54] PARKING LOCK MECHANISM FOR A VEHICLE HAVING AN INFINITELY VARIABLE TRANSMISSION

[75] Inventors: Toshio Takano, Hamura; Masahiko Takahashi, Tokyo, both of Japan

[73] Assignee: Fuji Jukogyo Kabushiki Kaisha, Tokyo, Japan

[21] Appl. No.: 693,709

[22] Filed: Jan. 23, 1985

[30] Foreign Application Priority Data

Jan. 31, 1984 [JP] Japan ................................. 59-15416

[51] Int. Cl.⁴ ........................... B60T 1/00; B60K 20/00
[52] U.S. Cl. ..................................... 192/4 A; 188/31; 74/475
[58] Field of Search ................. 192/4 A, 4 R; 188/31, 188/69; 74/411.5, 475

[56] References Cited

U.S. PATENT DOCUMENTS

| | | | |
|---|---|---|---|
| 3,539,039 | 11/1970 | Chang | 192/4 A |
| 3,912,050 | 10/1975 | Iwanaga et al. | 192/4 A |
| 4,487,302 | 12/1984 | Morimoto et al. | 192/4 A |
| 4,531,423 | 7/1985 | Fogelberg | 74/475 |

*Primary Examiner*—William F. Pate, III
*Assistant Examiner*—John Malcolm White
*Attorney, Agent, or Firm*—Martin A. Farber

[57] ABSTRACT

A parking lock mechanism for a vehicle having an infinitely variable transmission provided with a synchronizer for engaging a forward gear train and a reverse gear train with a main shaft of the transmission. A parking lock position in a shift pattern of a selector lever is located adjacent a reverse position so that the selector lever can be shifted to the parking lock position passing through the reverse position. This means that the selector lever can not be shifted during forward driving of the vehicle.

2 Claims, 7 Drawing Figures

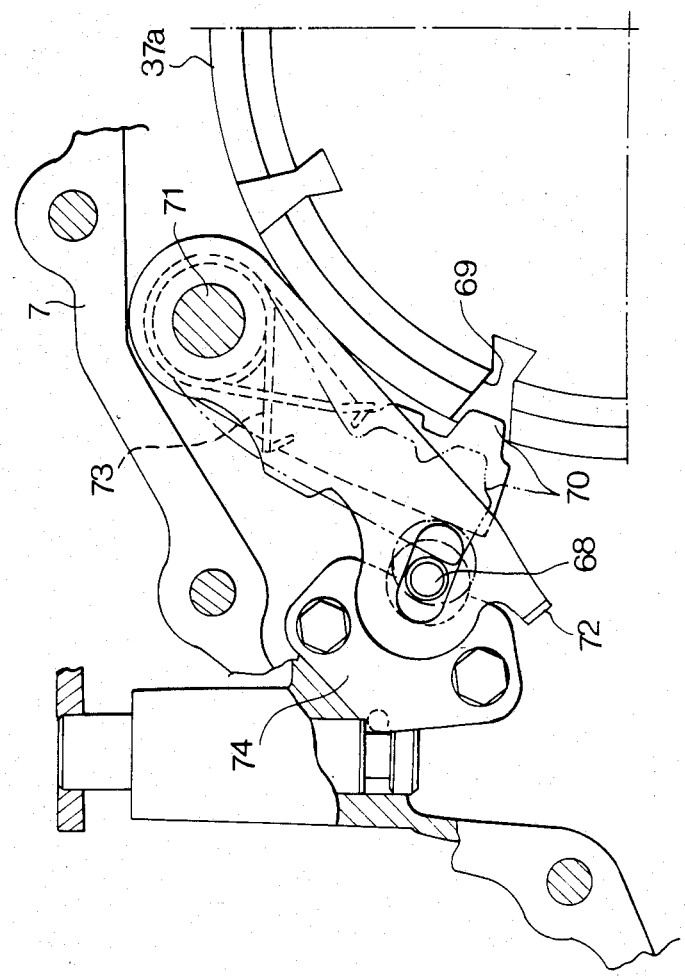

PARKING LOCK MECHANISM FOR A VEHICLE HAVING AN INFINITELY VARIABLE TRANSMISSION

BACKGROUND OF THE INVENTION

The present invention relates to a parking lock mechanism for a vehicle having an infinitely variable belt-drive transmission.

Japanese Patent Laid Open No. 57-173652 discloses a parking mechanism for an infinitely variable belt-drive transmission. The parking mechanism comprises a forward drive gear, a multiple-disc clutch for transmitting the power from a driven pulley of the transmission to the forward drive gear, a parking lock gear secured to the forward drive gear, a locking pawl, and a lever mechanism for actuating the locking pawl to engage the parking lock gear. The locking pawl is engaged with the parking lock gear by shifting a selector lever to a parking position. The selector lever can also be shifted to the parking position when driving the vehicle. Accordingly, if the selector lever is shifted to the parking position by mistake, the locking pawl engages the parking lock gear, which will cause breakdown of the mechanism.

SUMMARY OF THE INVENTION

The object of the present invention is to provide a parking lock mechanism for a vehicle in which a parking pawl can not be engaged with a locking notch during forward driving of the vehicle.

In accordance with the present invention, an infinitely variable transmission is provided with coupling means for engaging a forward gear train and a reverse gear train with a main shaft of the transmission, and with a shift pattern in which a parking lock position is located adjacent a reverse position so that a selector lever can be shifted to the parking lock position passing through the reverse position. Since, in order to shift the selector lever to the parking lock position, the reverse gear train must be in engagement with the main shaft, the selector lever can not be shifted during the forward driving.

According to the present invention, there is provided a parking lock mechanism for a vehicle having an infinitely variable transmission having a main shaft, a forward gear train, a reverse gear train, coupling means for engaging either of the forward and reverse gear trains with the main shaft, and a selector lever for selecting a forward drive range, reverse drive range, and parking lock range. The parking pawl mechanism comprises a parking pawl provided to be engaged with one of locking notches formed on one of rotative members of the transmission, first means for actuating the parking pawl to engage it with one of the locking notches, second means for transmitting the operation of the selector lever to the coupling means for selecting the drive ranges and the parking range, the second means being so arranged that the parking range is selected after the selection of the reverse drive range.

The first means comprises a cam engaging with the parking pawl to engage the parking pawl with the locking notch, and the second means comprises a cam plate rotated by the operation of the selector lever, and a cam follower operatively connected to the coupling means. The cam plate is arranged such that when the parking range is selected, the cam follower remains at a reverse drive range position to keep the engagement of the reverse gear train.

The other objects and features of this invention will be apparently understood from the following description with reference to the accompanying drawings.

BRIEF DESCRIPTION OF DRAWINGS

FIG. 6 is a sectional view taken along a line VI—VI in FIG. 5.

DETAILED DESCRIPTION OF THE PREFERRED EMBODIMENT

Figure 1A:
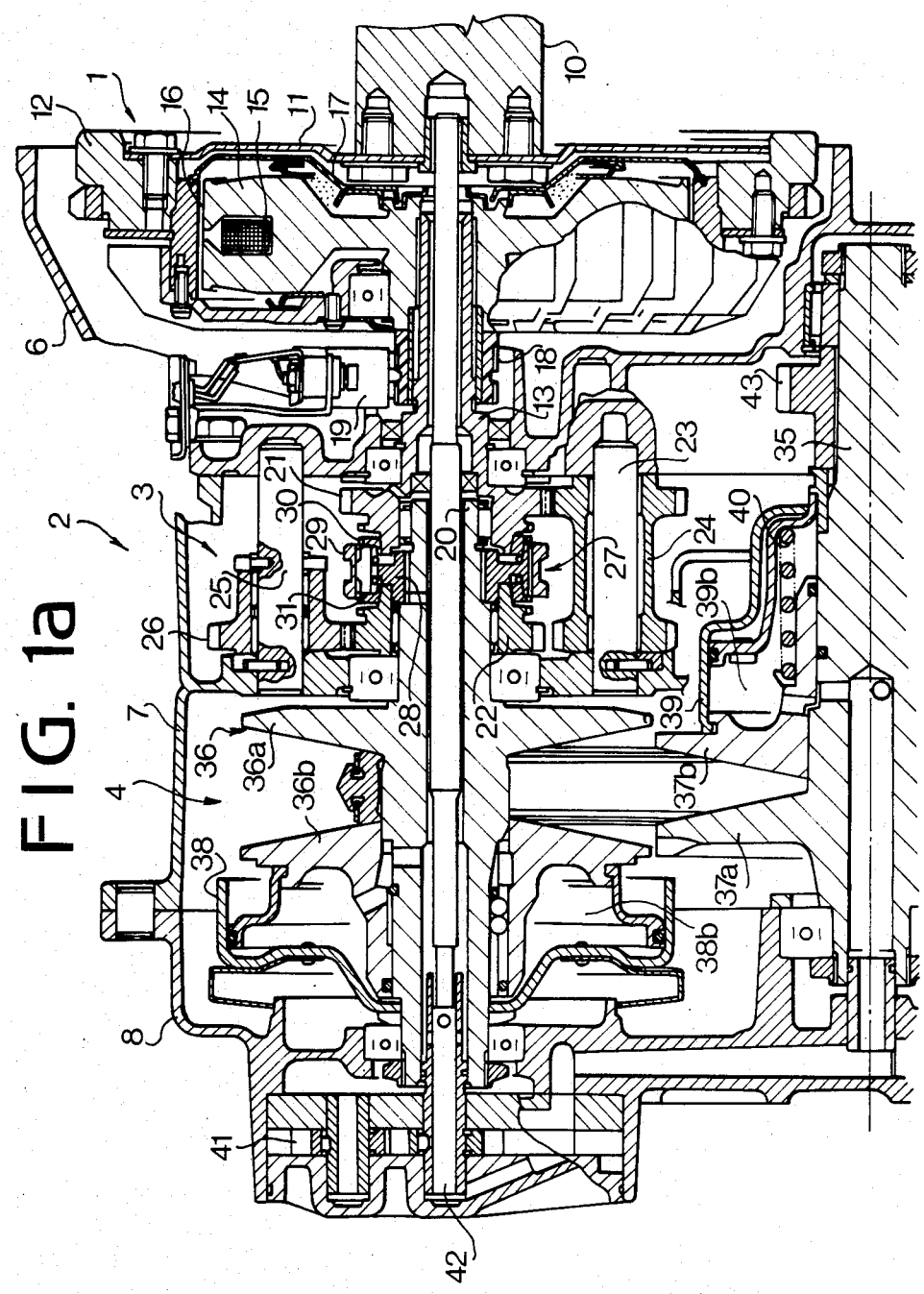
FIGS. 1a and 1b are sectional views of an infinitely variable belt-drive transmission to which the present invention is applied.
Figure 1B:
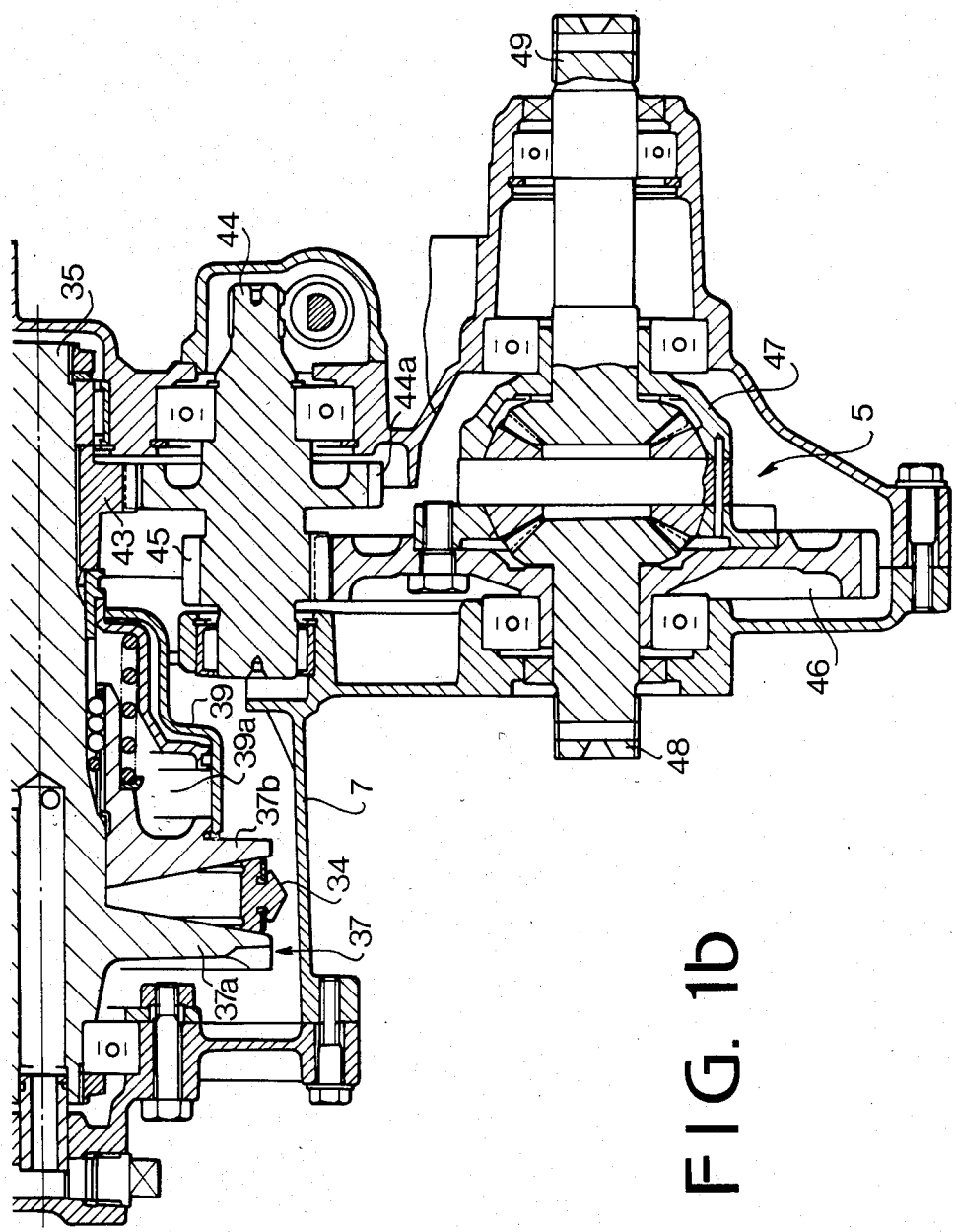

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with the input shaft 13, a reverse driven gear 22 rotatably mounted on the main shaft 20, and a synchronizer 27 as coupling means mounted on the main shaft 20. The drive gear 21 meshes with one of counter gears 24 rotatably mounted on a shaft 23. Another one of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) of a selector lever 50 (FIG. 2), the sleeve 29 does not engage either gear, so that the main shaft 20 is disconnected from the input shaft 13. When the sleeve 29 is engaged with the gear 21, the input shaft 13 is connected to the main shaft 20 through a forward gear train comprising the gear 21 and synchronizer 27 thereby to provide a forward drive position (D range).

When the sleeve 29 is engaged with the gear 22, the input shaft 13 is connected to the main shaft 20 through a reverse gear train comprising gears 21, 24, 26 and 22 to provide a reverse drive position (R range).

The main shaft 20 has an axial passage in which an oil pump driving shaft 42 connected to the crankshaft 10 is mounted. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite the disc 36a. The movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

The pressure oil control circuit is responsive to vehicle speed, engine speed and throttle valve position for controlling the oil from the oil pump 41 to the servo devices 38 and 39 thereby to move the discs 36b and 37b. Thus, the transmission ratio is infinitely changed.

Figure 2:
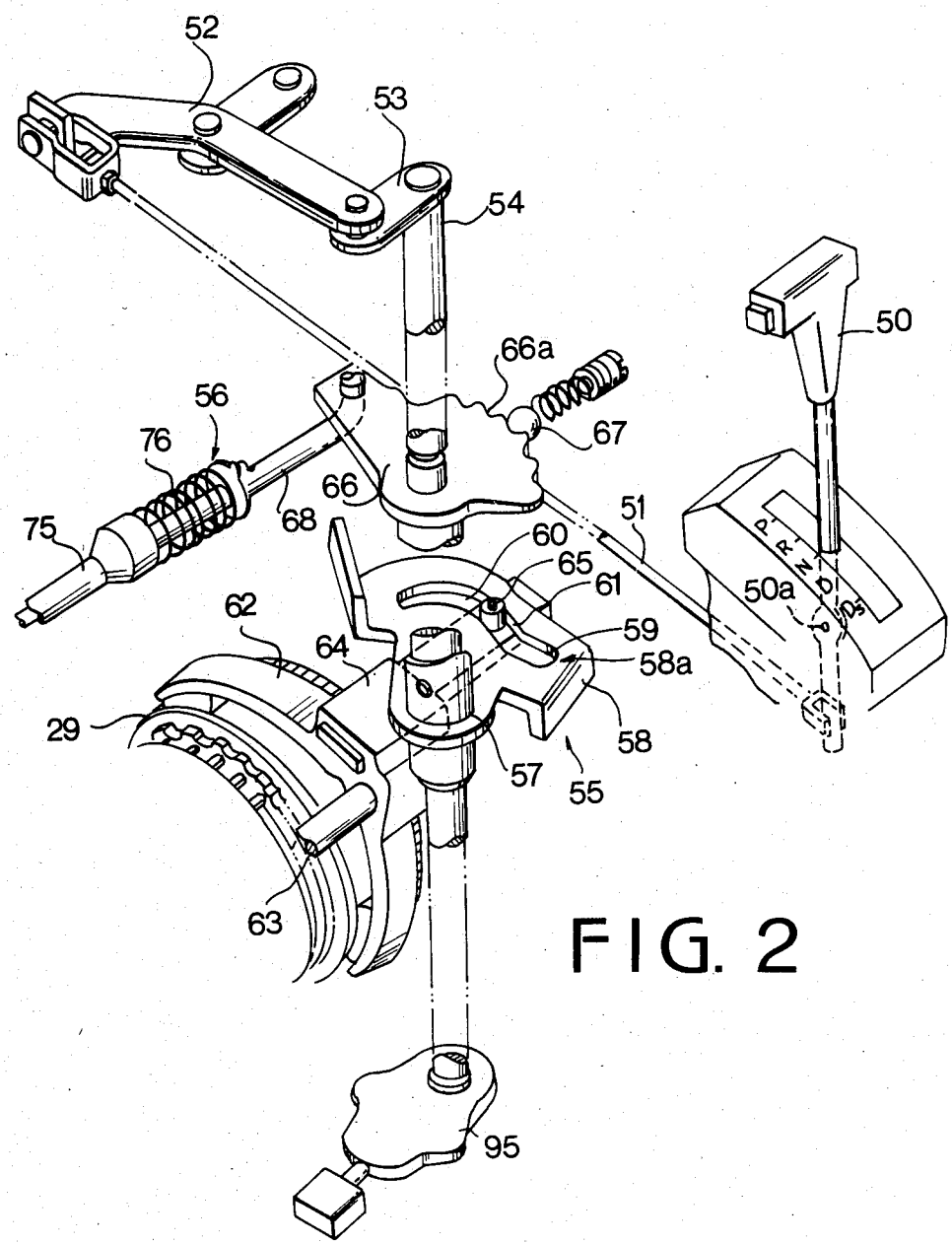
FIG. 2 is a perspective view showing a main part of the mechanism according to the present invention.
Figure 3:
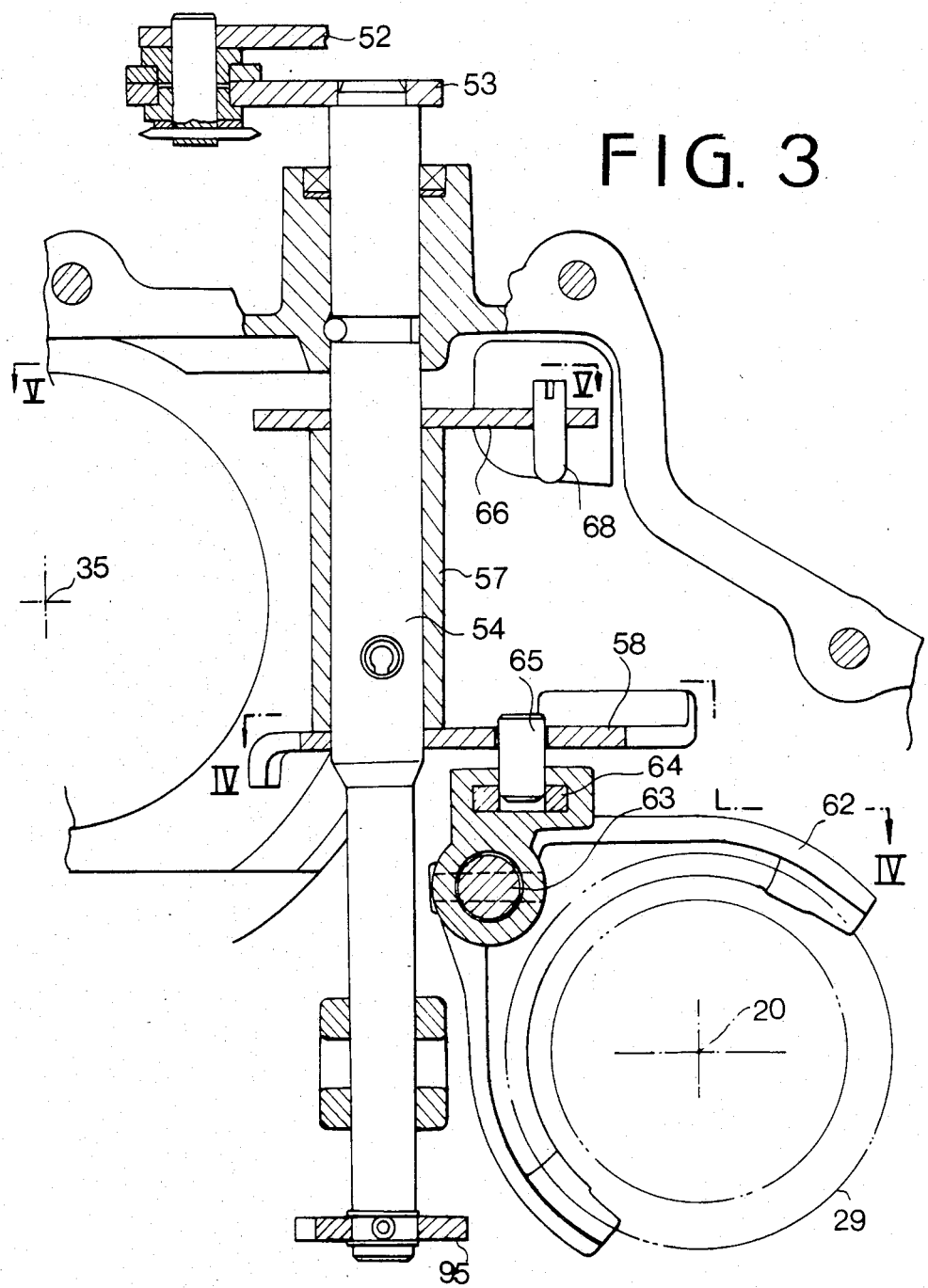
FIG. 3 is a sectional elevational view of the mechanism.

The mechanism of the present invention is hereinafter described referring to FIGS. 2 to 6. The selector lever 50 is adapted to be shifted to a parking position P, reverse position R, neutral position N, forward drive position D, and a high engine speed drive position Ds (Ds range). In accordance with the present invention, the parking position P is located behind the reverse position R, as shown in FIG. 2. The system is so arranged that the transmission ratio is downshifted when the Ds range is selected during driving at the D range. Referring to FIG. 2, the selector lever 50 is rotatably mounted on a shaft 50a and a lower end thereof is operatively connected to a vertical shaft 54 through a rod 51, and levers 53 and 52 so as to rotate the shaft 54. The vertical shaft 54 is positioned between the main shaft 20 and the output shaft 35 as shown in FIG. 3. A detent plate 66 having five indentations 66a is secured to the shaft 54 and a spring-loaded positioning ball 67 engages with the detent plate so as to engage one of the indentations 66a in order to hold the shaft at a selected angular position.

At a middle position of the shaft 54, a synchronizer operating mechanism 55 is provided, and a parking lock mechanism 56 and a cam 95 for detecting a selected position are provided at an upper portion and lower portion respectively.

Figure 4:
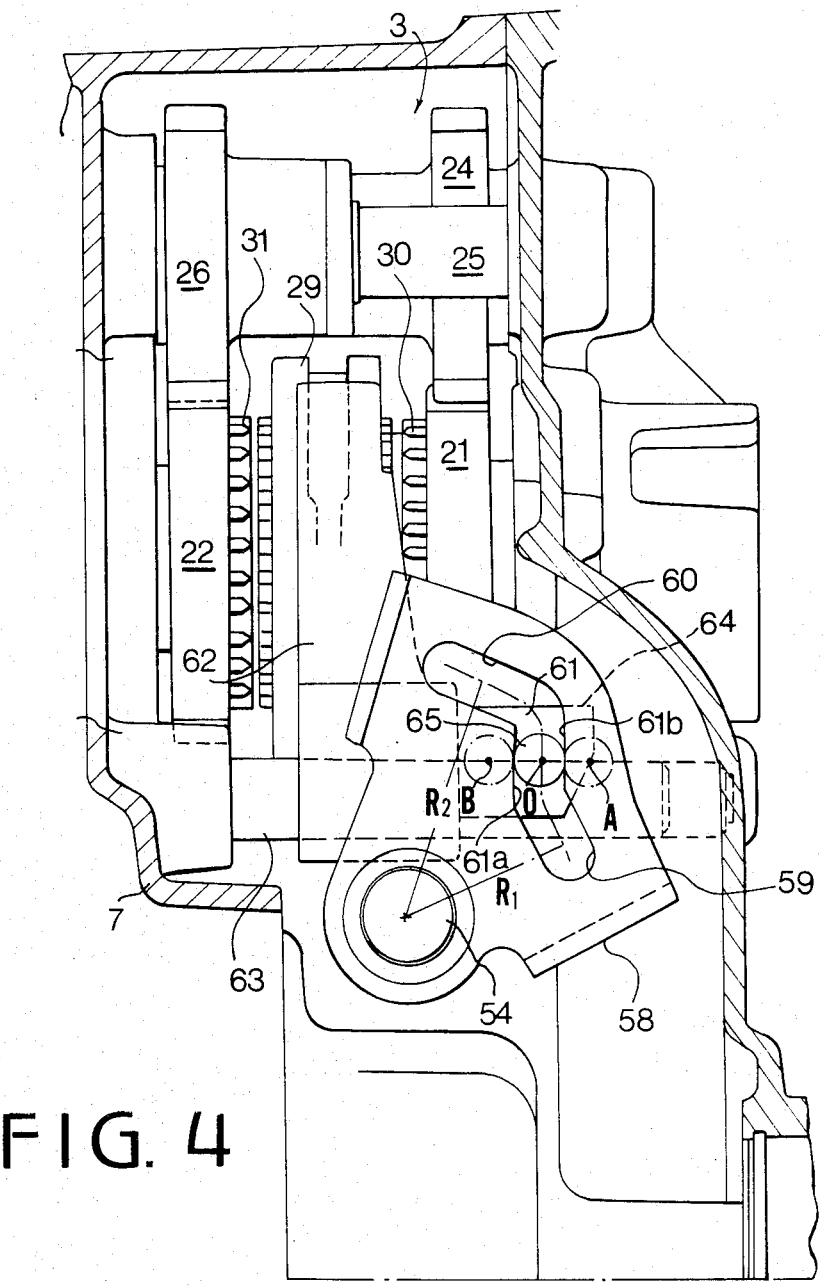
FIG. 4 is a sectional view taken along a line IV—IV in FIG. 3.

The synchronizer operating mechanism 55 comprises a sleeve 57 secured to the shaft 54 and a cam plate 58 secured to the sleeve 57. The cam plate 58, as shown in FIG. 4, has a cam groove 58a comprising a first arcuate portion 59 having a small diameter $R_1$ about the axis of the shaft 54, a second arcuate portion 60 having a large diameter $R_2$ and an intermediate straight portion 61 connecting the first and second arcuate portions 59, 60. A fork 62 engaging with the sleeve 29 of the selector device 3 is secured to a slidable shaft 63 which is slidably mounted in the main housing 7 (FIG. 4). The fork 62 has a projection 64 on which a cam follower 65 in the form of a roller is provided. The cam follower 65 engages with the wall of the cam groove 58a.

At the neutral position (N-range), the cam follower 65 is at a position "O" in the straight portion 61 as shown in FIG. 4. When the D-range is selected, the cam plate 58 rotates in the clockwise direction, and the cam follower 65 enters into the second arcuate portion 60 along an inside wall 61a. Thus the cam follower 65 is moved from the neutral position "O" to a forward drive position "A". When the cam plate 58 is further rotated in the clockwise direction for selecting the Ds-range, the cam follower 65 does not move from the position "A". When the cam plate 58 is rotated in the counterclockwise direction to the reverse position, the cam follower 65 enters into the first arcuate portion 59, so that the cam follower is moved to a position "B". When the cam plate is further rotated to the parking position, the cam follower does not move.

Figure 5:
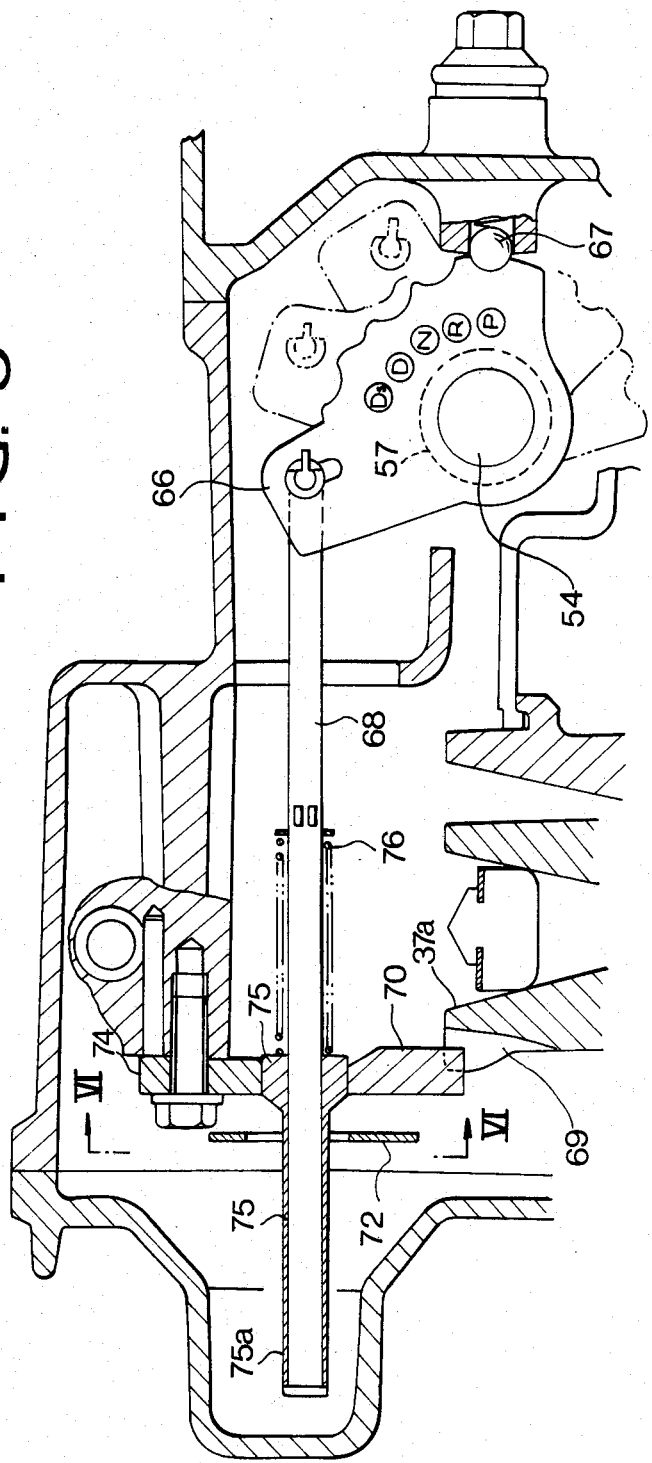
FIG. 5 is a sectional view taken along a line V—V in FIG. 3.

Referring to FIGS. 2, 5, and 6, the parking lock mechanism 56 comprises a rod 68 connected to the detent plate 66, and a parking pawl 70 rotatably mounted on a shaft 71 secured to the main housing 7 at a base end thereof and adapted to be engaged with one of locking notches 69 formed on the outside of the disc 37a of the driven pulley 37. A spring 73 provided between the pawl and a support plate 72 urges the pawl in the clockwise direction in FIG. 6, so that the back side of the pawl engages with a conical cam 75. The cam 75 has a cylindrical portion 75a which is slidably mounted on the rod 68 and biased by a spring 76 to the left in FIG. 5. Corresponding to the pawl 70, a pusher plate 74 is secured to the main housing 7 so as to engage with the cam 75 to push the pawl to the disc 37a.

In operation, when the selector lever 50 is at the neutral position, the cam follower 65 is positioned at the intermediate position "O" in FIG. 4. Accordingly, the selector device 3 is in the neutral state. When the selector lever 50 is shifted to the drive position D, the shaft 54 and cam plate 58 are rotated in the clockwise direction through levers 53 and 52. Accordingly, the cam follower 65 is moved from the position "O" to position "A" as described above, and the fork 62 is shifted to the right in FIG. 1. Thus, the synchronizer sleeve 29 is engaged with drive gear 21 to provide the forward drive state. When the Ds-range is selected from the forward drive position "D", the cam plate 58 rotates further in the clockwise direction, and the cam follower 65 is within the second arcuate portion 60. Accordingly, the sleeve 29 is not shifted to keep the forward drive state. When the R-range is selected by shifting the selector lever 50, cam plate 58 rotates in the counter-clockwise direction (FIG. 4), the cam follower 65 is shifted to the position "B", so that the sleeve 29 is moved to the left in FIG. 1 to engage the gear 22 with the main shaft 20 through the synchronizer 27. Thus, the reverse drive transmission system is provided.

The P-range is selected after the engagement of the reverse gear train. Namely, when the selector lever 50 is shifted to the parking position P, the selector lever passes the reverse position R. When the shaft 54 rotates in the counter-clockwise direction (FIG. 4), the cam follower 65 remains at the reverse position. On the other hand, the rod 68 is located at the left-most position by the detent plate 66 as shown in FIG. 5, so that the cam 75 enters between the pusher plate 74 and pawl 70. Thus, the pawl 70 is rotated about the shaft 71 to engage with one of the notches 69 as shown in FIG. 6. If the pawl does not coincide with the notch 69, the cam 75 can not enter between the plate 74 and the pawl 70. Accordingly, the spring 76 is compressed to permit the movement of the rod 68. When one of the notches 69 coincides with the pawl 70 because of slight movement of the vehicle, the pawl engages with the notch to lock the disc 37a.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a parking lock mechanism for a vehicle having an infinitely variable transmission having a main shaft, a forward gear train, a reverse gear train, coupling means for engaging either of the forward and reverse gear trains with the main shaft, and a selector lever for selecting a forward drive range, reverse drive range, and parking lock range, the improvement comprising:

a parking pawl provided to be engaged with one of locking notches formed on one of rotative members on an output shaft of the transmission;

first means for actuating the parking pawl to engage it with one of the locking notches;

second means comprising a cam plate rotated by the operation of the selector lever and a cam follower operatively connected to the coupling means for transmitting the operation of the selector lever to the coupling means for selecting the drive ranges and the parking range, the second means being so arranged that the parking range is selected after the selection of the reverse drive range; and the cam plate being so arranged that when the parking range is selected, the cam follower remains at a reverse drive range position to keep the engagement of the reverse gear train.

2. In a parking lock mechanism for a vehicle having an infinitely variable transmission having a main shaft, a forward gear train, a reverse gear train, coupling means for engaging either of the forward and reverse gear trains with the main shaft, and a selector lever for selecting a forward drive range, reverse drive range, and parking lock range, the improvement comprising:

a parking pawl provided to be engaged with one of locking notches formed on one of rotative members on an output shaft of the transmission;

first means comprising a cam engaging with the parking pawl to engage the parking pawl with the locking notch;

second means comprising a cam plate rotated by the operation of the selector lever and a cam follower operatively connected to the coupling means for transmitting the operation of the selector lever to the coupling means for selecting the drive ranges and the parking range, the second means being so arranged that the parking range is selected after the selection of the reverse drive range;

the cam plate being so arranged that when the parking range is selected, the cam follower remains at a reverse drive range position to keep the engagement of the reverse gear train.

* * * * *